United States Patent
Golinsky et al.

(10) Patent No.: US 10,589,203 B1
(45) Date of Patent: Mar. 17, 2020

(54) FILTER DEVICE

(71) Applicant: Hydac Technology Corporation, Bethlehem, PA (US)

(72) Inventors: James Golinsky, Bethlehem, PA (US); Michael Todd Evans, Whitehall, PA (US); Timothy Jay Barr, Allentown, PA (US); William Michael Sassano, Easton, PA (US); Joseph Gerard Quirk, Bethlehem, PA (US); Bhavbhuti Upamanyu Pandya, Hackettstown, NJ (US)

(73) Assignee: HYDAC TECHNOLOGY CORPORATION, Bethlehem, PA (US)

( * ) Notice: Subject to any disclaimer, the term of this patent is extended or adjusted under 35 U.S.C. 154(b) by 0 days.

(21) Appl. No.: 16/182,753

(22) Filed: Nov. 7, 2018

(51) Int. Cl.
  *B01D 35/30* (2006.01)
  *B01D 29/15* (2006.01)
  *B01D 35/147* (2006.01)

(52) U.S. Cl.
  CPC ............ *B01D 35/30* (2013.01); *B01D 29/15* (2013.01); *B01D 35/1475* (2013.01); *B01D 2201/291* (2013.01); *B01D 2201/30* (2013.01)

(58) Field of Classification Search
  CPC .... B01D 35/30; B01D 35/1475; B01D 29/15; B01D 2201/291; B01D 2201/30
  USPC ..................................... 210/435, 450, 493.2
  See application file for complete search history.

(56) References Cited

U.S. PATENT DOCUMENTS

| | | | |
|---|---|---|---|
| 8,337,582 B2 | 12/2012 | Feisthauer et al. | |
| 9,044,695 B2 | 6/2015 | Sann et al. | |
| 2010/0025317 A1* | 2/2010 | Fall | B01D 29/21 210/237 |
| 2013/0228504 A1 | 9/2013 | McElroy et al. | |
| 2017/0030384 A1 | 2/2017 | Pastori | |

FOREIGN PATENT DOCUMENTS

EP        3 124 092        2/2017

* cited by examiner

*Primary Examiner* — Madeline Gonzalez
(74) *Attorney, Agent, or Firm* — Wenderoth, Lind & Ponack, L.L.P.

(57) ABSTRACT

A filter device includes a device housing (2) removably accommodating a filter element (26) with an element material (28) extending between two end members (32, 34). One end member (34) has a wall member (46) of a polygonal shape inserted into an accommodating space (66) of an accommodating member (36) attached to the device housing (2). The accommodating member (36) also has a polygon-shaped wall member (68). The wall members are disposed adjacent and facing each other in an accommodating state. The accommodating space (66) is delimited outwards by its wall member (68) with a polygonal shape. A further wall member (70) with a circular shape delimits the accommodating space (66) to the inside and passes through a circular transfer space (76) in the adjacently disposed end member (34).

10 Claims, 4 Drawing Sheets

FILTER DEVICE

FIELD OF THE INVENTION

The invention concerns a filter device comprising a device housing that accommodates a filter element in a removable manner. The filter element is provided with an element material that extends between two end members. One end member is provided with a wall member of a polygonal shape, which wall member is inserted into an accommodating space of an accommodating member that is attached to the device housing. The accommodating member also having a polygon-shaped wall member. The wall members with the polygon-shaped end member and accommodating member are disposed adjacent and opposite each other in the accommodating state.

BACKGROUND OF THE INVENTION

Filter devices of this kind are prior art, for example, in EP 3 124 092 A1. Devices of this kind are advantageously used for the filtration of hydraulic fluids in hydraulic systems and for the filtration of different types of fuel, lubricating oils or other process fluids. The filter device disclosed in the above-named document, in which the wall members that are provided to position the filter element and that are disposed between an end member and associated accommodating member, has the advantage compared to the other prior art that the filter element is secured against rotating during operation due to the polygonal shape of the interacting wall members.

This structure avoids that the rotation of the filter element, which is caused by flow forces and which damages the interacting surfaces through friction during operation, in particular the respective sealing elements through abrasion. Since the filter element can only be installed in a functional position when the polygonal shapes of end member and accommodating member match, simultaneously this structure prevents the incorrect fitting of the device with a filter element that is unsuitable for the application.

SUMMARY OF THE INVENTION

Based upon this art, an object of the invention is to provide an improved filter device of the kind described at the outset, which is characterized by a further improved performance while retaining the advantages of the prior art.

According to the invention, this object is basically met by a filter device having, as a significant feature of the invention, an accommodating space delimited outwardly by its wall member with a polygonal shape, and at least one further wall member with a circular shape. This circular wall member delimits the accommodating space at least partially to the inside and passes through a circular transfer space in the adjacently disposed end member.

In the described, known solution the polygonal-shaped wall member of the accommodating member is formed through a socket with a polygon-shaped outline. That socket extends at the accommodating member in the direction of the filter element and, in contrast to the present invention, delimits the accommodating space towards the inside and is therefore disposed at a radial distance from the wall member that forms the inner circumferential wall of the accommodating member. Formed also in the end member of the known solution is, corresponding to this accommodating member, a socket-shaped protruding connection, which is attachable for the installation of the filter element onto the polygon-shaped socket of the accommodating member and which is provided on the inside with the corresponding wall member in polygon-shape. In this arrangement the polygonal wall members, which provide the guiding surfaces for the positioning and fixing of the filter element against the forces present during operation, are disposed at a radial distance to the outside of accommodating member and end member.

In contrast, in the invention the polygonal wall member of the accommodating member delimits the accommodating space towards the outside, and therefore, extends along the entire outer circumference of the accommodating space. A much further expanded guiding and retaining surface is available for the interaction with the assigned polygonal wall member of the end member, which also extends radially outside on the end member, than is the case with the radially further inside located sockets of the known solution. The filter element is then located particularly secure against forces that act during operation. Moreover, the installation process is simpler than with the known solution in which the filter element has to be pushed onto a protruding socket during installation, which also poses the danger of damaging the socket through tilting. While in the known solution the inner side of the polygonal socket has an in cross-sectional polygonal transfer space in the accommodating member, in the invention the transfer space is delimited in a circular shape due to the circular wall member of the accommodating member, which in turn simplifies the sealing task compared to the sealing of polygonal surfaces.

Concerning sealing, the arrangement may advantageously be such that, between the adjacently located, opposing wall members with the respective polygon shapes of end member and accommodating member, a seal is disposed that seals the accommodating space towards the outside, and a further seal on the end member forms the seal of the accommodating space towards the inside.

The further seal may advantageously be overlapped at its free end, which faces the element material of the filter element, by a cover that is in contact with the seal.

The end member, made in form of an end cap, may advantageously surround the element material at the end with an annular segment. The wall member with its polygon shape extends as a single piece from the annular segment on the side that faces away from the element material and extends from the annular segment axially with a predeterminable protrusion length.

Concerning the design of the end cap, which forms the end member, the arrangement may advantageously be such that the annular segment is disposed concentrically to an annular surface of the end member, which supports the further seal radially to the inside. A bottom-end part of the annular segment is attached to the annular surface via connecting webs, which form a connecting space between them that follows, in terms of its contour, the polygon-shape of the wall member of the end member.

In advantageous exemplary embodiments, the accommodating member is provided on the side that faces away from the accommodating space with a connector, which may be connected to an intermediary bottom of the device housing. A screw connection may advantageously be provided for that connector.

The arrangement may advantageously be made such that, when the wall member is received in the accommodating member with the polygon-shape of the end member, the bottom-end part of the annular segment rests on the accommodating member in such a way that an axial distance between end member and accommodating member remains.

The axial distance formed as annular space is delimited towards the inside by the further, circular-shaped wall member of the accommodating member.

Advantageously, multiple further, circular-shaped wall members, which, shaped as individual segments, can be disposed at a distance from each other, resting on the bottom-end part of the accommodating space and delimiting a passage space towards the inside. The passage space is disposed concentric with respect to the transfer space of the end member.

In preferred exemplary embodiments, the intermediary bottom subdivides the device housing in horizontal direction into an unfiltrate space and a filtrate space. Each of space is provided with at least one inlet or outlet respectively. The filter element is disposed in the unfiltrate space and is connected in a fluid-conducting manner with its inner space at the bottom via the passage space of the accommodating member to the filtrate space.

An object of the invention is also a filter element for the filter device according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
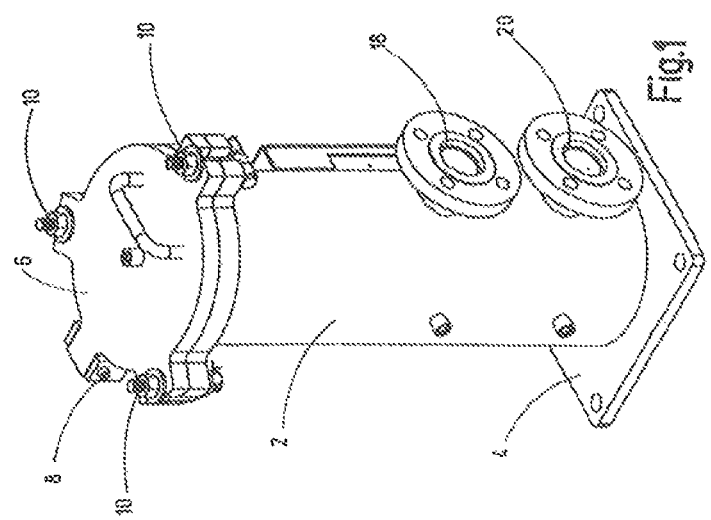
FIG. 1 is a perspective view of a filter device according to an exemplary embodiment of the invention.
Figure 2:
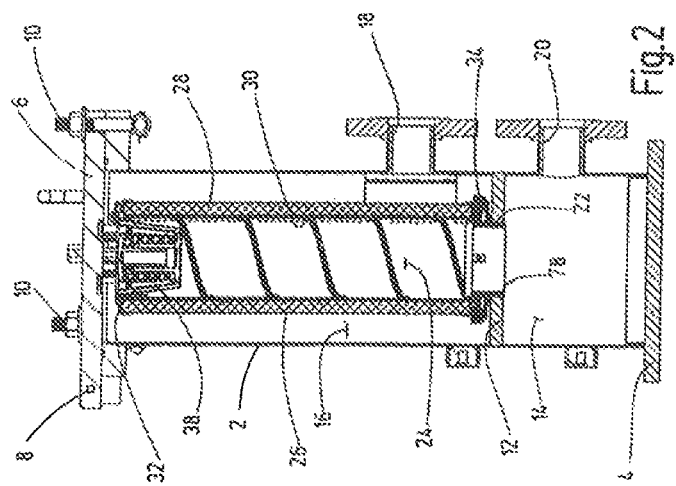
FIG. 2 is a schematically, side view in section of the exemplary embodiment.

FIGS. 1 and 2, which illustrate in full the exemplary embodiment of the filter device according to the invention, comprises a device housing 2 in form of a circular cylinder. Device housing 2 is closed by a bottom plate 4 shown at the lower end in FIGS. 1 and 2. The open, upper end the housing 2 may be closed with a cover 6, which is pivotally attached with a hinge 8, may be pivoted into a position that opens access to housing 2, and may be locked in a position that closes the housing 2 by clamping bolts 10 shown in FIGS. 1 and 2.

At approximately one quarter of the height of the housing 2, its inner space is subdivided by an intermediary bottom 12 into a lower filtrate space 14 bordering onto the bottom plate 4 and into an unfiltrate space 16 situated above lower filtrate space 14.

An unfiltrate connection 18 is provided for the supply of unfiltrate to the unfiltrate space 16 in the housing wall above the intermediary bottom 12. A filtrate connection 20 is provided as an outlet of the filtrate space 14 offset downwardly in axial direction of housing 2, below the intermediary bottom 12. The intermediary bottom 12 is provided with a centrally located opening 22, which forms the passage into the inner filtrate space 24 of a filter element 26 and which extends inside the unfiltrate space 16 from the intermediary bottom 12 up to the housing cover 6.

The filter element 26 comprises a hollow-cylindrical element material 28, at the inside of which is disposed a fluid-permeable support tube 30 that surrounds the filtrate space 24 inside the filter element and supports the inside of the element material 28 during filter operation. In operation, the element material 28 is permeated from the outer unfiltrate space 16 to the inner filtrate space 24, from which the filtrate flows via opening 22 in the intermediary bottom 12 to the filtrate space 14.

The axial ends of the element material 28 together with the support tube 30 are retained in an upper end member or cap 32 and in a lower, end member or cap 34 of the filter element 26. In the manner usual for filter elements 26 of this kind, a bypass valve 28 of known design is disposed at the upper end member 32, which is triggered by the pressure in the unfiltrate space 16, forming a fluid path that bypasses the element material 28.

Figure 3:
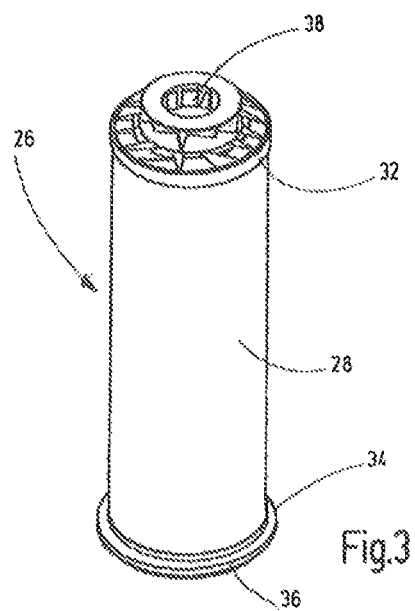
FIG. 3 is a perspective view of a separately illustrated filter element of the exemplary embodiment, showing its upper end member provided with a bypass valve.
Figure 4:
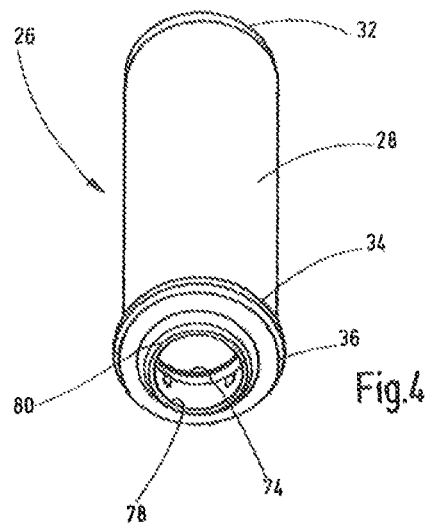
FIG. 4 is a perspective view of the filter element with view onto its other, lower end member.
Figure 5:
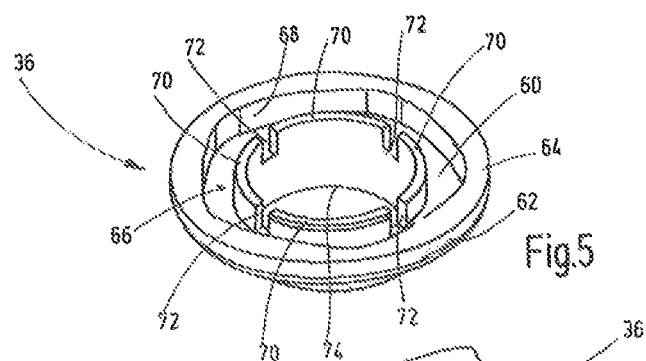
FIG. 5 is a perspective view of a separately illustrated accommodating member with a view of its upper end, which faces the filter element.
Figure 6:
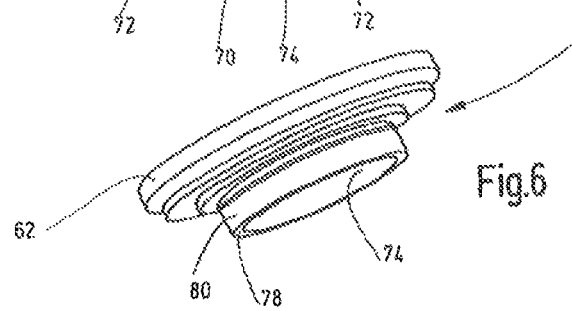
FIG. 6 is a perspective view of the accommodating member in FIG. 5 with a view of its lower end.
Figure 7:
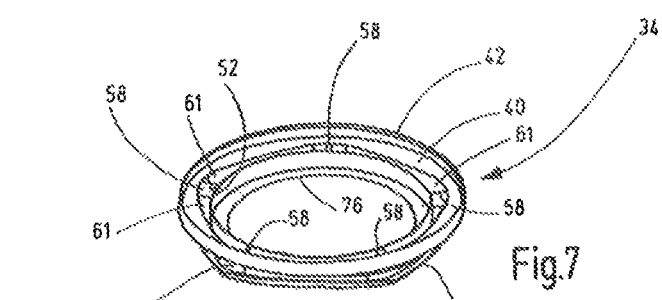
FIG. 7 is a perspective view of the separately illustrated lower end member of the filter element, with a view onto its upper end, which faces the element material.
Figure 8:
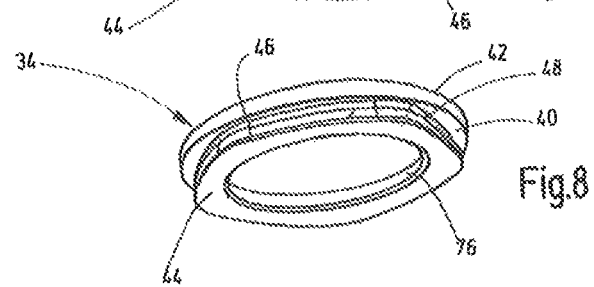
FIG. 8 is a perspective view of the end member of FIG. 7 with a view of its lower end.
Figure 9:
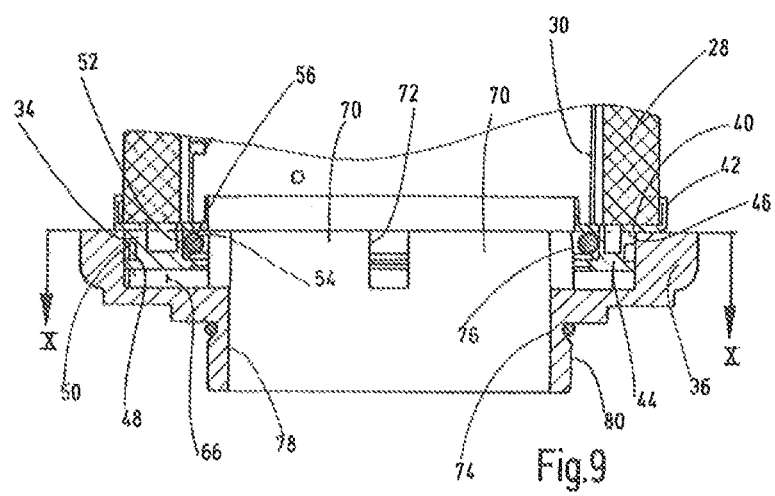
FIG. 9 is a truncated and enlarged partial side view in section of the filter element adjacent to the lower end member, which is located in the assigned accommodating member of the filter device when it is in its accommodating state.
Figure 10:
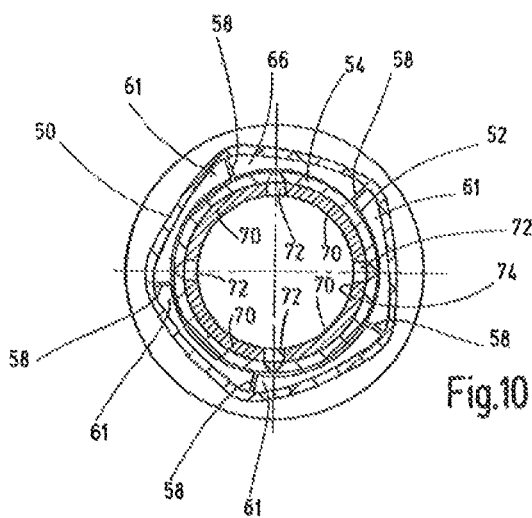
FIG. 10 is an end view in section in half the size compared to FIG. 9, taken along line X-X in FIG. 9.

FIGS. 5 to 10 show more details of the filter element 26, shown separately in FIGS. 3 and 4, of its lower end member 34 as well as of an accommodating member 36, which may be attached to device housing 2 and, in device housing 2, forms the element accommodating member of the filter element 26. Each of FIGS. 9 and 10 show the installed state in which the lower end member 34 of the filter element 26 is in the accommodating state in accommodating member 36. As FIGS. 7 to 9 show, the end member 34 is provided with an annular segment 40 with a protruding circumferential edge 42 to form an end cap, which together surround for the element material 38 and the support tube 30. An insert 44 is joined as a single piece at the lower end of the annular segment 40, located in a radial pane. The insert 44 forms with its outer circumference the polygonal wall member 46 of the end member 34. The wall member 46, which has the shape of a pentagon with rounded corners, is provided at the outer circumference with an annular groove 48, which retains a sealing ring 50 of a first seal (see FIG. 9). A sealing ring 54 of a further or second seal (see FIG. 9) is in contact with an inner annular surface 52 that is concentric to the circumferential edge 42 of the annular segment 40. As is also shown in FIG. 9, the sealing ring 54 is overlapped by a cover 56 that is in contact with sealing ring 54. As shown in FIGS. 7 and 10, the inner annular surface 52 is connected to the underside of the annular segment 40 via connecting webs 58, which provide a connecting space 61 between them that follows overall the shape of a polygon.

FIGS. 9 and 10 show the lower end member 34 with insert 44 in an accommodating state in which it is inserted into the accommodating space 66 of the accommodating member 36. As is shown most clearly in FIGS. 5 and 6, the accommodating member 36 is provided with a circular annular body 62 with a planar upper side 64, in which the accommodating space 66 is formed through a recess with a planar bottom 60. The recess that forms the accommodating space 66 is bounded radially towards the outside by a polygonal wall member 68 having its polygonal shape corresponding to the pentagon of the wall member 46 of end member 34. The accommodating space 66 is bounded radially inwards by annular segments 70 that protrude from the bottom 60 and that leave gaps 72 between them. The annular segments 70 bound with their inside a passage space 74, which is concentric to the inner transfer space 76 of end member 34.

FIG. 1 shows the filter element 26 which, as shown in FIGS. 9 and 10, is in its accommodating state inserted into the accommodating member 36 with its lower end member 34, that is, in the functional position inserted into the device housing 2 in which the accommodating member 36 is attached to the intermediary bottom 12. To form the connection by a thread, the accommodating member 36 is provided with a connector 78 that forms the outlet of passage space 74 and that is provided with an external thread 80. Through the screw connection formed at the opening 22 of the intermediary bottom 12, the inner space 24 of filter element 26 is connected to the filtrate space 14. As shown in FIG. 9, the annular segment 40 is at the bottom in contact with the upper end 64 of the accommodating member 36 in the accommodating state. As a result, the end member 34 is kept at a distance from the bottom 60 of the accommodating space 66.

While one embodiment has been chosen to illustrate the invention, it will be understood by those skilled in the art that various changes and modifications can be made therein without departing from the scope of the invention as defined in the claims.

The invention claimed is:

1. A filter device, comprising:
 a device housing including an accommodating member being attached in said device housing, having an accommodating space and having a polygon-shaped first wall member, said accommodating space being delimited radially outwardly by said first wall member of said accommodating member and being delimited radially inwardly by a circular wall member on said accommodating member; and
 a filter element removably accommodated in said device housing, said filter element including an element material extending between first and second end members, said second end member having a second wall member with a polygonal shape inserted into said accommodating space, said first and second wall members of said accommodating member and of said second end member, respectively, are disposed adjacent and facing each other in said accommodating space, said second end member having a circular transfer space therein, said circular wall member of said accommodating member extending through said circular transfer space.

2. A filter device according to claim 1 wherein
 a first seal is disposed between said first and second wall members sealing said accommodating space on an outside of said accommodating space; and
 a second seal is on said second end member sealing said accommodating space on an inside of said accommodating space.

3. A filter device according to claim 2 wherein
 said second seal is overlapped on a free side thereof facing said element material of said filter element by a cover contacting said second seal.

4. A filter device according to claim 2 wherein
 said second end member comprises end cap surrounding said element material at an adjacent end thereof with an annular segment of said end cap, said second wall member extending as a single and unitary piece from said annular segment on a side thereof facing away from said element material and extending from said annular segment axially with a predeterminable protrusion length.

5. A filter device according to claim 4 wherein
 said annular segment is disposed concentrically relative to an annular surface of said second end member that supports said second seal radially to an inside of said annular surface;
 a bottom-end part of said annular segment is attached to said annular surface by connecting webs forming a connecting space between said annular segment and said annular surface having a contour of said polygon shape of said second wall member of said second end member.

6. A filter device according to claim 1 wherein
 said accommodating member comprises a connector on a side of said accommodating member facing away from accommodating space, said connector being coupled to an intermediary bottom in said device housing.

7. A filter device according to claim 5 wherein
 said bottom-end part of said annular segment rests on said accommodating member with an axial distance between said second end member and said accommodating member forming an annular space delimiting towards an inside thereof by said circular wall member of said accommodating member when said second wall member is received in said accommodating member.

8. A filter device according to claim 1 wherein
 said circular wall member comprises multiple individual segments being disposed at a distance from each other, resting on a bottom-end part of said accommodating space and delimiting a passage space toward radial insides thereof concentric with said transfer space of second end member.

9. A filter device according to claim 8 wherein
 a horizontally extending intermediary bottom subdivides said device housing into an unfiltrate space with an inlet and a filtrate space with an outlet, an inner space of said filter element being disposed in said unfiltrate space and being connected in fluid communication with said filtrate space at a bottom of said inner space via said passage space of said accommodating member.

10. A filter device according to claim 1 wherein
 said polygon shape of said second wall member of said second end member is standardized for insertion in said accommodating space of said accommodating member.

* * * * *